United States Patent [19]
Saito

[11] Patent Number: 5,307,174
[45] Date of Patent: Apr. 26, 1994

[54] HIGH EFFICIENCY FACSIMILE TRANSMISSION APPARATUS

[75] Inventor: Kazuo Saito, Hyogo, Japan

[73] Assignee: Mitsubishi Denki Kabushiki Kaisha, Tokyo, Japan

[21] Appl. No.: 813,643

[22] Filed: Dec. 27, 1991

[30] Foreign Application Priority Data

Jan. 11, 1991 [JP] Japan .................. 3-002143

[51] Int. Cl.$^5$ ............................................. H04N 1/00
[52] U.S. Cl. .................................... 358/400; 379/100
[58] Field of Search ............ 358/400, 405, 407, 434, 358/435, 436, 437, 438, 439; 379/100, 101, 93; H04N 1/00

[56] References Cited

U.S. PATENT DOCUMENTS

| | | |
|---|---|---|
| 4,894,843 | 1/1990 | Yoshida et al. ............... 379/100 |
| 4,901,343 | 2/1990 | Yamaguchi ...................... 358/400 |
| 5,210,621 | 5/1993 | Kinoshita ........................ 379/100 |

Primary Examiner—Edward L. Coles, Sr.
Assistant Examiner—Jerome Grant, II
Attorney, Agent, or Firm—Rothwell, Figg, Ernst & Kurz

[57] ABSTRACT

In a public telephone circuit using DCME and DSI, an apparatus with high line efficiency is obtained by demodulating the facsimile signal and transmitting the signal after converting it to a low transmission rate signal. An apparatus of the present invention connected to the exchanger at the trunk side input port comprises bearer interfaces connected to the DCME, FAX modems (3), a multiplexer (4) and a FAX modem discriminator (11). The apparatus demodulates the facsimile signal received from the trunk side input port and transmits the demodulated signal through the transmission line having 64 kbit/s on-demand clear channel under the CCITT recommendation Q. 50.

3 Claims, 10 Drawing Sheets

HIGH EFFICIENCY FACSIMILE TRANSMISSION APPARATUS

BACKGROUND OF THE INVENTION

1. Field of the Invention

The invention relates to a facsimile transmission apparatus for transmitting the facsimile signal with high efficiency which is connected to a DSI (Digital Speech Interpolation) unit and a DCME (Digital Circuit Multiplication Equipment) unit in the line which includes voice signal and facsimile signal, for example, a public telephone circuit.

2. Description of the Prior Art

There are two kinds of prior art described hereinafter.

FIG. 9 is a block diagram of a conventional facsimile apparatus for demodulating and digitizing a facsimile signal and then transmitting it, and also for transmitting a facsimile signal without storing the facsimile signal, that is, operating in a real time operation.

In FIG. 9, 51 is a trunk side analog input port, 52 is a trunk side analog output port, 53 is facsimile modem (FAX modem), 54 is a multiplexer, 55 is a bearer side digital output port, 56 is a bearer side input port. The facsimile signal from the trunk side analog input port 51 is inputted to the FAX modem 53, demodulated in the FAX modem 53 and converted to a digital signal having a maximum bit rates of 9.6 kbit/s. The digital signal is transmitted to the multiplexer 54 and multiplexed to a higher speed multiplexed signal and is transmitted from the bearer side signal output port 55 to a remote side multiplexer 54 through a remote bearer side input port.

In the receiving side, the multiplexer 54 derives the digital facsimile signal having a maximum bit rate of 9.6 kbit/s from the high speed multiplexed signal received from the remote side multiplexer, and sends it to the FAX modem 53. The signal is modulated in the FAX modem 53 and converted into an analog signal, then transmitted to the trunk side output port 52.

In the conventional apparatus, an input facsimile signal goes through the apparatus without being stored in the apparatus, and is transmitted to the remote apparatus. Namely, the conventional apparatus operates as a real time operation apparatus. In the conventional apparatus, the input signal is restricted to the facsimile signal. Therefore, the voice signal which can not be transmitted to the FAX modem must be controlled to avoid being passed through the apparatus at the pre-stage of the trunk side port 51, 52. Also, the apparatus must be compatible with procedures which include all types of facsimile apparatus and its combinations. Therefore, procedures which are not compatible with the apparatus can not be used.

A number of FAX modems are able to operated in parallel within the range of the transmission capacity. Though each input is one analog line in the above description, it can use a digital input by providing a digital/analog converter in front of the trunk side input.

FIG. 10 shows another conventional art system in which the trunk side interface is the same as is in FIG. 9. In FIG. 10, 57 is a receiving facsimile modem (FAX modem), 58 is a transmitting FAX modem, 59 is a receiving data storage device, 60 is a transmitting data storage device. The input signal is inputted to the receiving FAX modem 57 from the trunk side port 51. The receiving FAX modem 57 terminates the facsimile signal in contrast with the FAX modem 53 of FIG. 9. The receiving FAX modem 57 operates in accordance with the same procedure for the remote side facsimile apparatus. The receiving FAX modem 57 sends the digital signal of the picture facsimile to the receiving data storage device 59. The receiving data storage device 59 stores the picture signal. In FIG. 9, the output of the FAX modem 53 includes the facsimile control signal, but the output of the apparatus in FIG. 10 includes only picture signal. The stored picture signal is transmitted to the bearer output port 55 under the control of the multiplexer 54 when there is available capacity on the bearer transmission line. The output signal is inputted to the remote side multiplexer 54 through the remote side input bearer port 56. The remote side multiplexer 54 derives the picture input signal from the high speed signal and stores it into the transmitting data storage device 60. The transmitting FAX modem 58 operates as a typical facsimile apparatus. The transmitting FAX modem 58 calls the designated destination facsimile and sends the picture data by the typical facsimile procedure when the call is connected. In the facsimile apparatus, the picture data are usually output to paper, but in this apparatus the picture data are stored in the transmitting data storage device 60. If the designated destination facsimile is busy, then the same operation is repeated.

In FIG. 10, the apparatus includes a plurality of the transmitting FAX modems 58, but if the capacity of the transmitting data storage device 60 is large, one transmitting FAX modems 58 will have the same function. If the number of the transmitting FAX modem 58 is small, the storage time becomes long and the advantage of the facsimile, that is in real time operation, is lost.

As explained above in FIG. 9, the conventional apparatus needs a facsimile signal for its input signal. That is, the apparatus provided at the trunk side shown in FIG. 9 must send only a facsimile signal to this facsimile transmission apparatus. In the case where the connected apparatus is discriminated in advance as a facsimile apparatus or a telephone set, for example, such as in a PBX system, this facsimile transmission apparatus can be used if the facsimile signal is selectively transmitted to the facsimile transmission apparatus. This facsimile transmission apparatus must correspond to all facsimile signals. There are many facsimile procedures, for example, tonal procedure, and binary procedure. CCITT recommendation T. 30 allows use of other non-standard procedures which are used only in some manufactures. In the conventional apparatus shown in FIG. 9, the facsimile transmission apparatus can be used only for the system which corresponds to the particular facsimile apparatus. Therefore, if the facsimile transmission apparatus procedure is not compatible with the facsimile apparatus procedure, the facsimile transmission apparatus can not be used with a public telephone circuit which includes many non-compatible procedures.

The apparatus provided at the trunk side shown in FIG. 10 must send only a facsimile signal to this facsimile transmission apparatus in the same way as is in FIG. 9.

The facsimile transmission procedure need not be compatible with all procedures described in FIG. 9. It may receive the signal by a procedure which corresponds to the facsimile transmission procedure. The facsimile transmission apparatus is able to transmit the signal by its own procedures at the output transmitting side. In FIG. 10, since the facsimile transmission apparatus terminates and stores the signal, time delay becomes large. Therefore, the apparatus practically can not be used with a the public telephone circuit which operates on a time basis.

Accordingly, it is an object of the present invention to provide a facsimile transmission apparatus which can be used for all types of public telephone circuits and which is not restricted by a particular kind of facsimile apparatus.

It is further object of the present invention to provide a facsimile transmission apparatus which increases the bearer side efficiency compared with the facsimile transmission apparatus using only DCME and DSI.

It is still further object of the present invention to provide a facsimile transmission apparatus which permits a decrease in the number of the FAX modems.

SUMMARY OF THE INVENTION

In accordance with the present invention, a high efficiency facsimile transmission apparatus is provided in a digital public telephone circuit and comprises a transmitting route switch connected to the trunk side input port, facsimile modems, a multiplexer connected to the facsimile modems and a receiving route switch. The transmitting route switch discriminates the facsimile signal and voice signal, the facsimile signal is sent to the facsimile modems, the voice signals are transmitted directly to a bearer side voice route output port. The facsimile modems demodulate the facsimile signal received from the transmitting route switch or modulates the signal received from the multiplexer. The multiplexer multiplexes a plurality of demodulated facsimile signals and transmit them directly to the bearer side facsimile route output port, prevents the transmission of the voice signal which is switched to the facsimile route line, sets up a clear channel on the bearer side facsimile route, transmits control a signal to the facsimile route output port, receives a control signal from the remote side multiplexer, and derives the multiplexed facsimile signal and sends it to the responsive facsimile modem. The receiving route switch switches the signal received from the facsimile modem and the input voice signal received from the bearer route, and sends the switched signals to the trunk side output port.

The high efficiency facsimile transmission apparatus of the present invention further comprises a facsimile signal discriminator provided between said trunk side input port and the multiplexer, the facsimile signal discriminator detecting only the facsimile signal and transmitting it to the facsimile modem.

The high efficiency facsimile transmission apparatus of the present invention still further comprises a telephone modem signal discriminator provided between said trunk side input and said multiplexer, said telephone modem signal discriminator detecting only the telephone modem signal and transmitting it to the telephone modem.

DETAILED DESCRIPTION OF THE PREFERRED EMBODIMENTS

Before the present invention is described, the operation of the DCME system operating according to the CCITT recommendation Q. 50 is explained, which is used in combination with the facsimile transmitting apparatus of the present invention.

Figure 3:
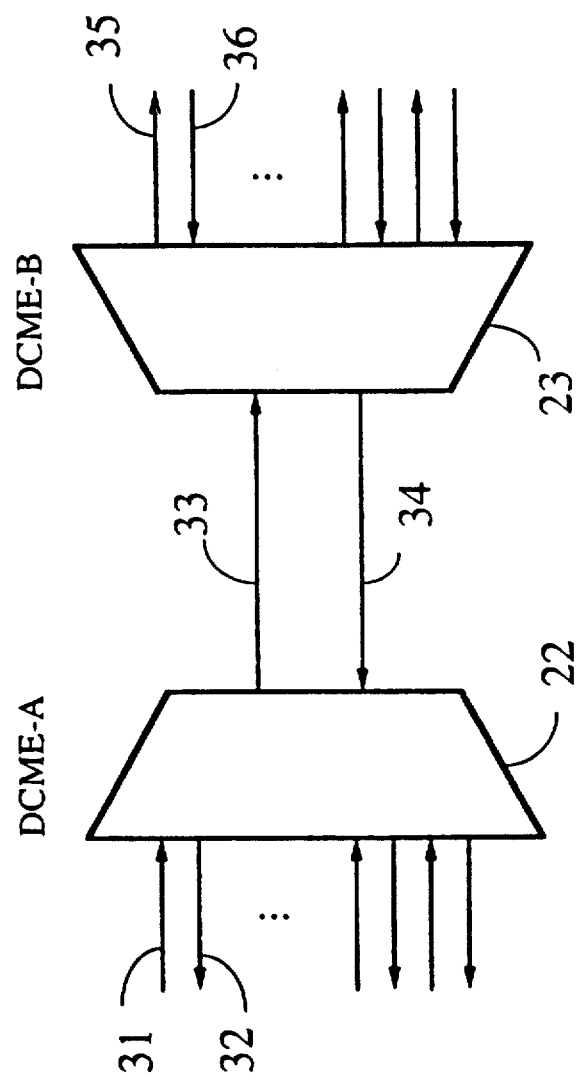
FIG. 3 is a general operational schematic of DCME.

In FIG. 3, 22 is a DCME-A and 23 is a DCME-B which is arranged on the remote side of the DCME-A. 33 is trunk input and 32 is a trunk output. 35 is an output and 36 is inputted.

Figure 4:
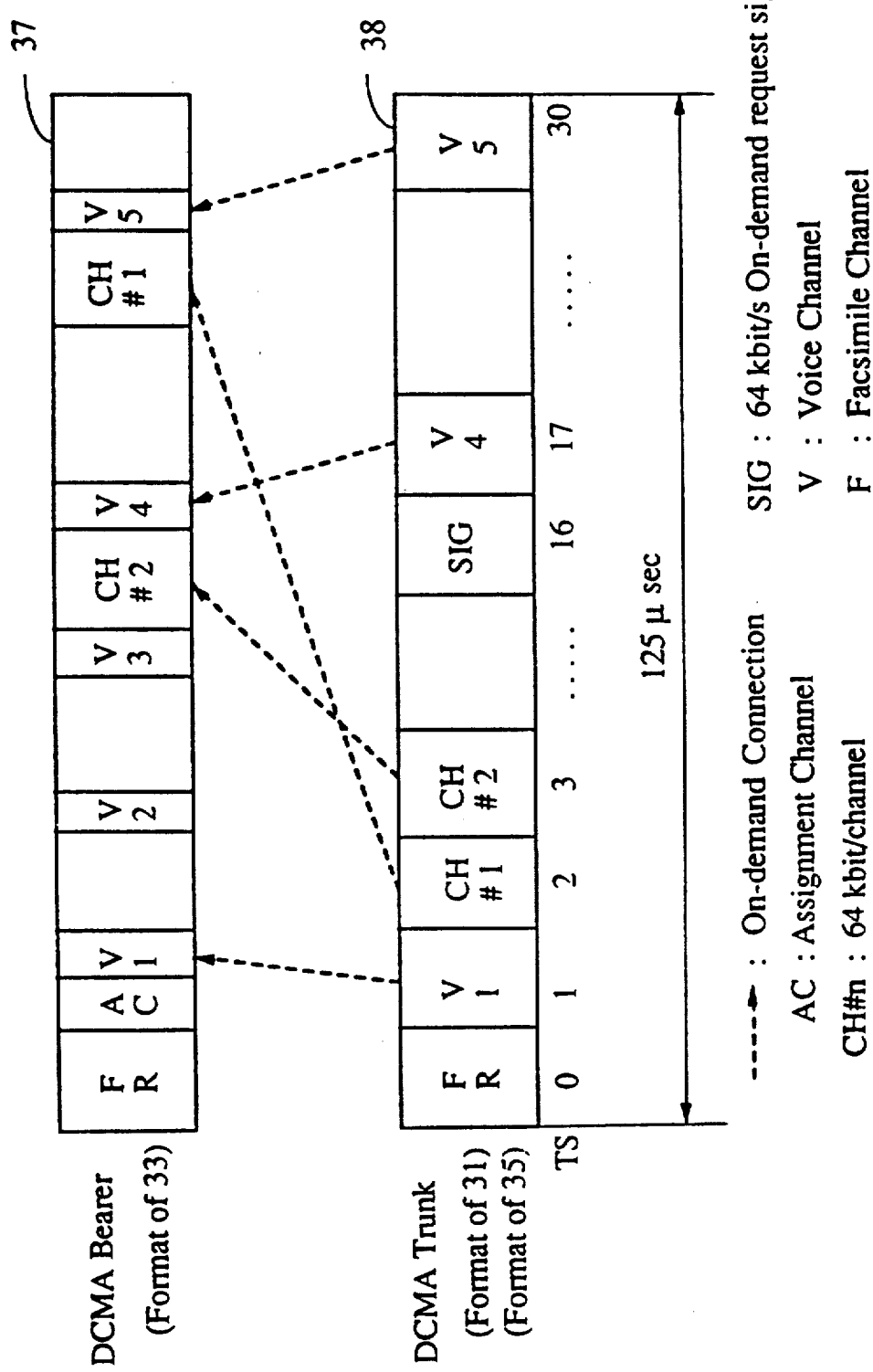
FIG. 4 shows a DCME frame format of the present invention.

FIG. 4 shows frame formats of the DCME (Digital Circuit Multiplication Equipment) signals. In FIG. 4, 37 is a DCME bearer frame format, and 38 is a trunk frame format. DCME-A 22 detects the input signal from the trunk side whether it includes an active signal or an in-active signal. If the input signal includes an active signal, then DCME-A 22 search an idle channel and send the input signal to the idle channel. If the input signal includes in-active signal, DCME-A 22 does not send the input signal. DCME-A 22 sends the information on the connection condition to the remote DCME-B 23 by using the assignment channel labeled AC in FIG. 4. The remote DCME-B 23 reconstructs the bearer format which is the output from the DCME-A 22 on the basis of the information from the assignment channel, and outputs it to the same trunk channel which is sent by the DCME-A 22. In this manner, the trunk side active signal of the DCME-A 22 is outputted to the trunk side of the DCME-B 23. That is, in connection with the active signal, the same signal which is inputted to the trunk side of the DCME-A 22 is outputted to the trunk side output of the DCME-B 23. The signal is actually transmitted on the bearer line only when the input signal includes the active signal. Therefore the apparatus requires fewer bits to be transmitted. In the DCME system, the line numbers are compressed to ¼~1/5 by the function of the above mentioned voice interpolation (DSI) and ADPCM which decreases the transmission bits.

The CCITT recommendation Q. 50 defines a clear channel of 64 kbit/s for the DCME bearer and a signaling interface of the transmission line setting request signal of the voice band data as well as an over load control signal and a maintenance release. The pure data such as the computer data is able to be transmitted through the usual 64 kbit/s PCM line, but can not be transmitted through the DCME. This is because the signal is transmitted as the low transmission rate signal converted by the ADPCM in the DCME to the bearer line. The CCITT recommendation Q. 50 defines an interface of 64 kbit/s on demand clear channel which has the 64 kbit/s transmission rate on the bearer as occasion demands.

In the present invention, 64 kbit/s clear channel function is used between the DCME and FAX adaptor under the CCITT recommendation Q. 50. The on-demand setup of the 64 kbit/s clear channel is carried out by the request signal which is usually outputted from the switching system to the DCME through the trunk input port. The switching system at the trunk side transmits 64 kbit/s on-demand request signal (SIG) by the time slot 16 (TS 16) of the CEPT interface. FIG. 4 shows the on-demand request signal (SIG) which is request signal of channel basis. When the SIG is detected in the DCME trunk format, the DCME-A 22 sends the request signal of the 64 kbit/s clear channel to the remote DCME-B 23 using the assignment channel and searches an idle channel and sets up the 64 kbit/s clear channel like CH#1 and CH#2 as shown in FIG. 4. The position of the 64 kbit/s clear channel is determined at random since the idle channel is searched by the DSI function of the DCME.

Embodiment 1

Figure 1:
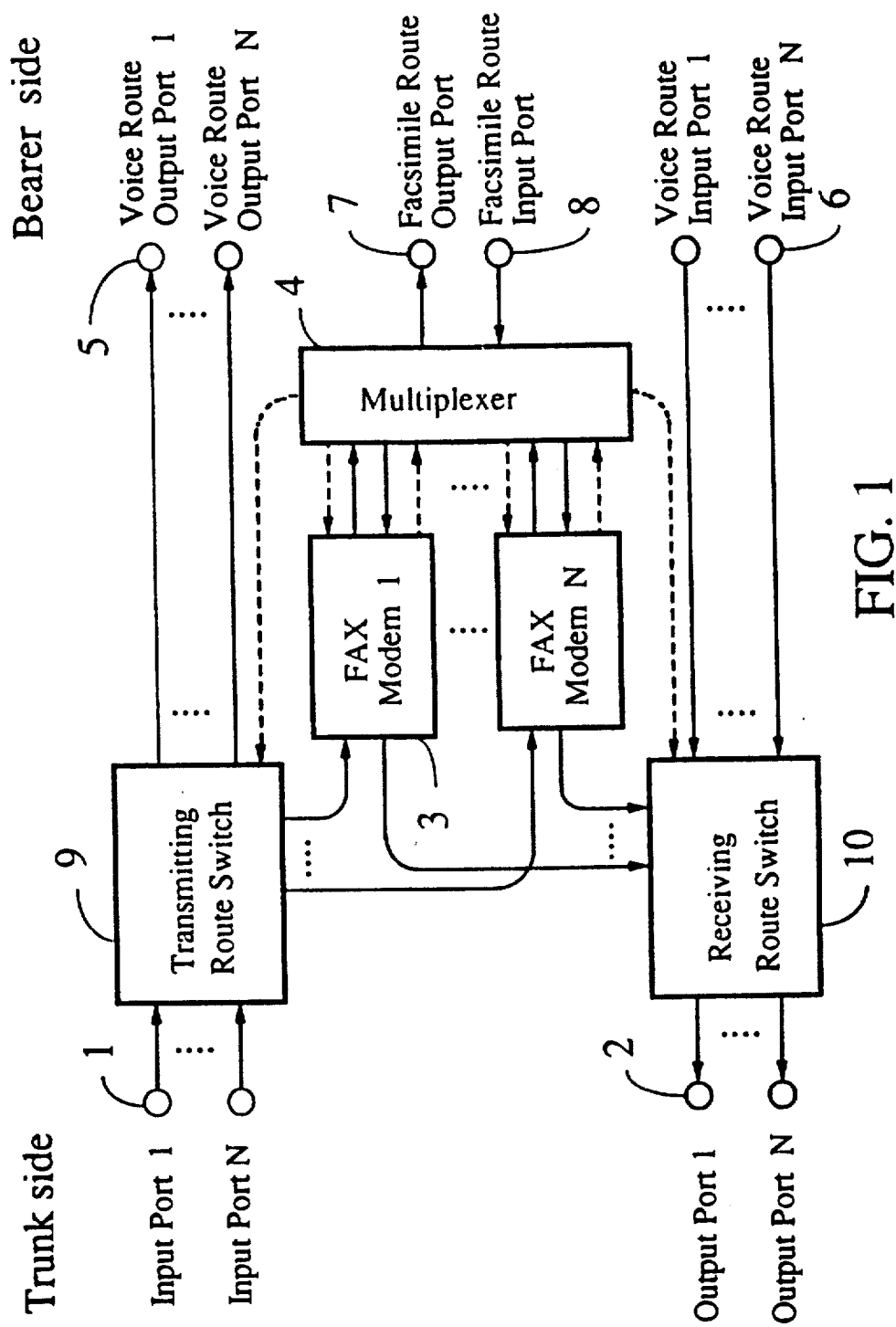
FIG. 1 shows a FAX system incorporating a first embodiment of the present invention.
Figure 9:
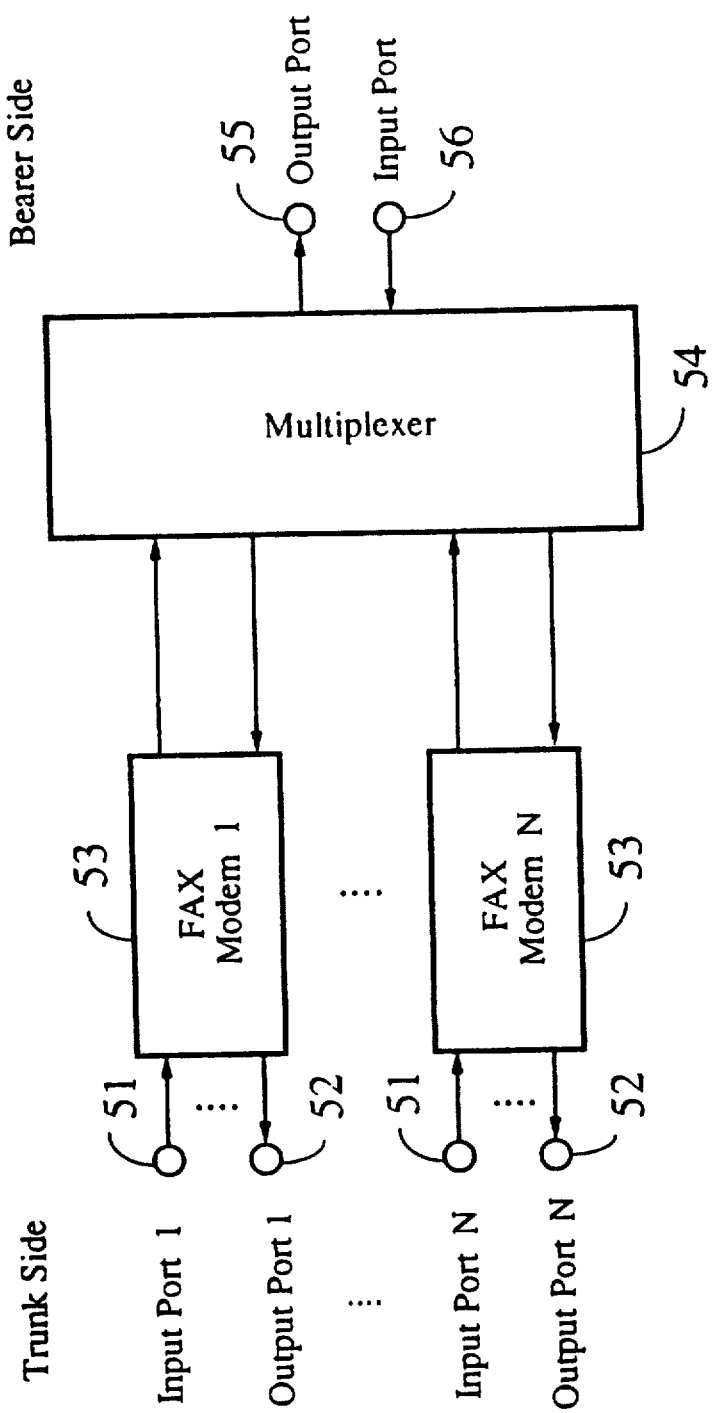
FIG. 9 is a block diagram of a conventional real time facsimile apparatus.
Figure 10:
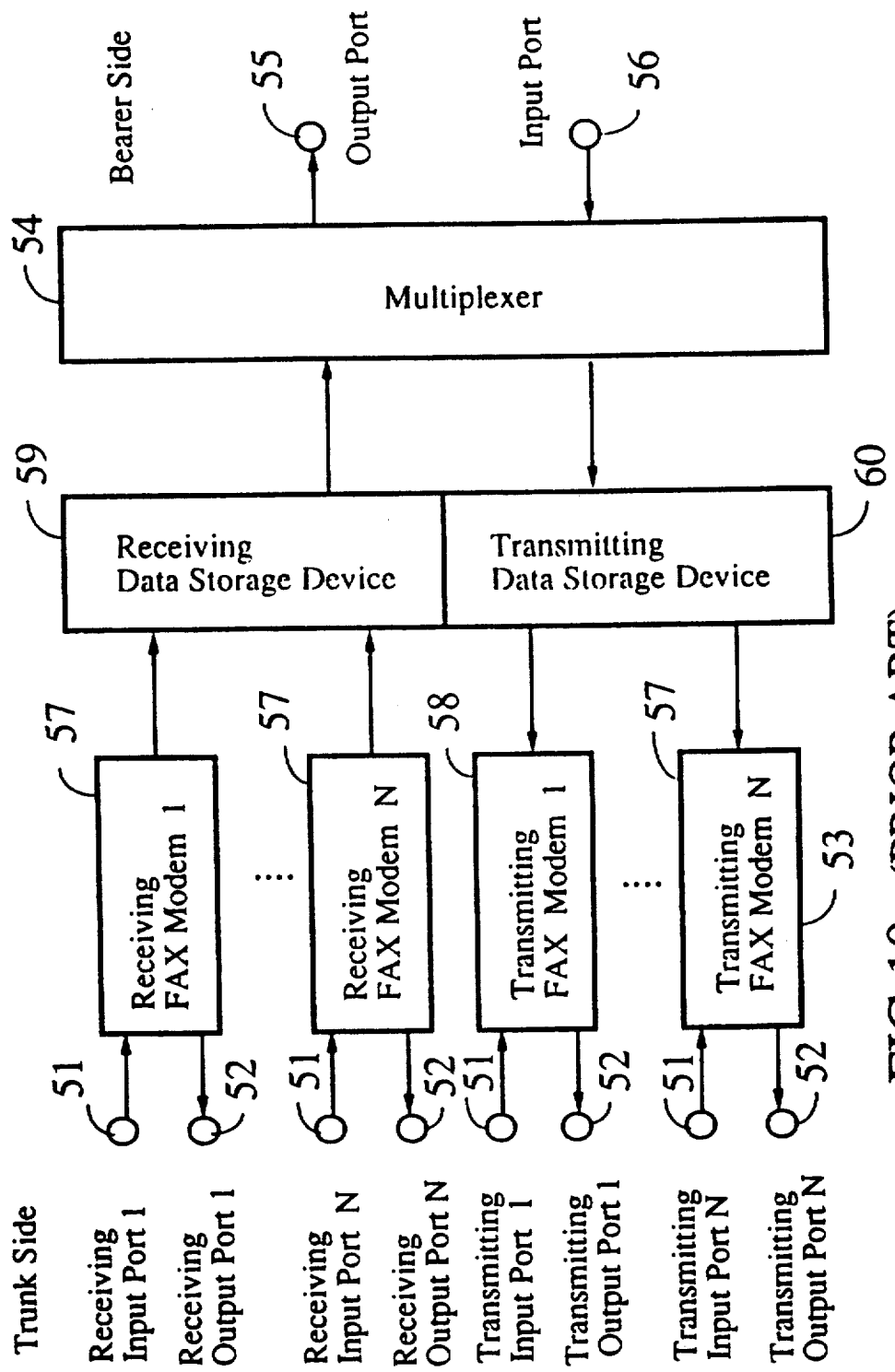
FIG. 10 is a block diagram of a conventional stored type facsimile apparatus.

FIG. 1 shows a first embodiment of the FAX adaptor of the present invention. In FIG. 1, 1 is a trunk side input port. The trunk side input port 1 may be an analog input signal or a digital input signal, and also may be one channel or multiplexed channels in the same way as shown in the input 51 of conventional art of FIG. 9. 2 is a trunk side output port, 5 is a bearer side voice route output port and 6 is a bearer side voice route input port. 7 is a bearer side facsimile route output port. 8 is a bearer side facsimile route input port. 3 is facsimile modem (FAX modem) which demodulates the modulated signal received from the trunk side and outputs it to the bearer side as a pure digital data, and modulates the pure digital signal received from the bearer side and outputs it to the trunk side. 4 is a multiplexer which multiplexes the pure digital data received from the FAX modem 3 and outputs to the bearer side, and demultiplexes the pure digital data received from the bearer side and outputs it to the FAX modem 3. A transmitting route switch 9 switches the signal received from the trunk side to the bearer side voice route output port 5 or to the FAX modem 3 or to both under the control of the multiplexer 4. 9 is a transmitting route switch. 10 is a receiving route switch. The receiving route switch 10 switches the signal received from the FAX modem 3 to the trunk side or the bearer side voice route input port 6 to the trunk side.

Figure 5:
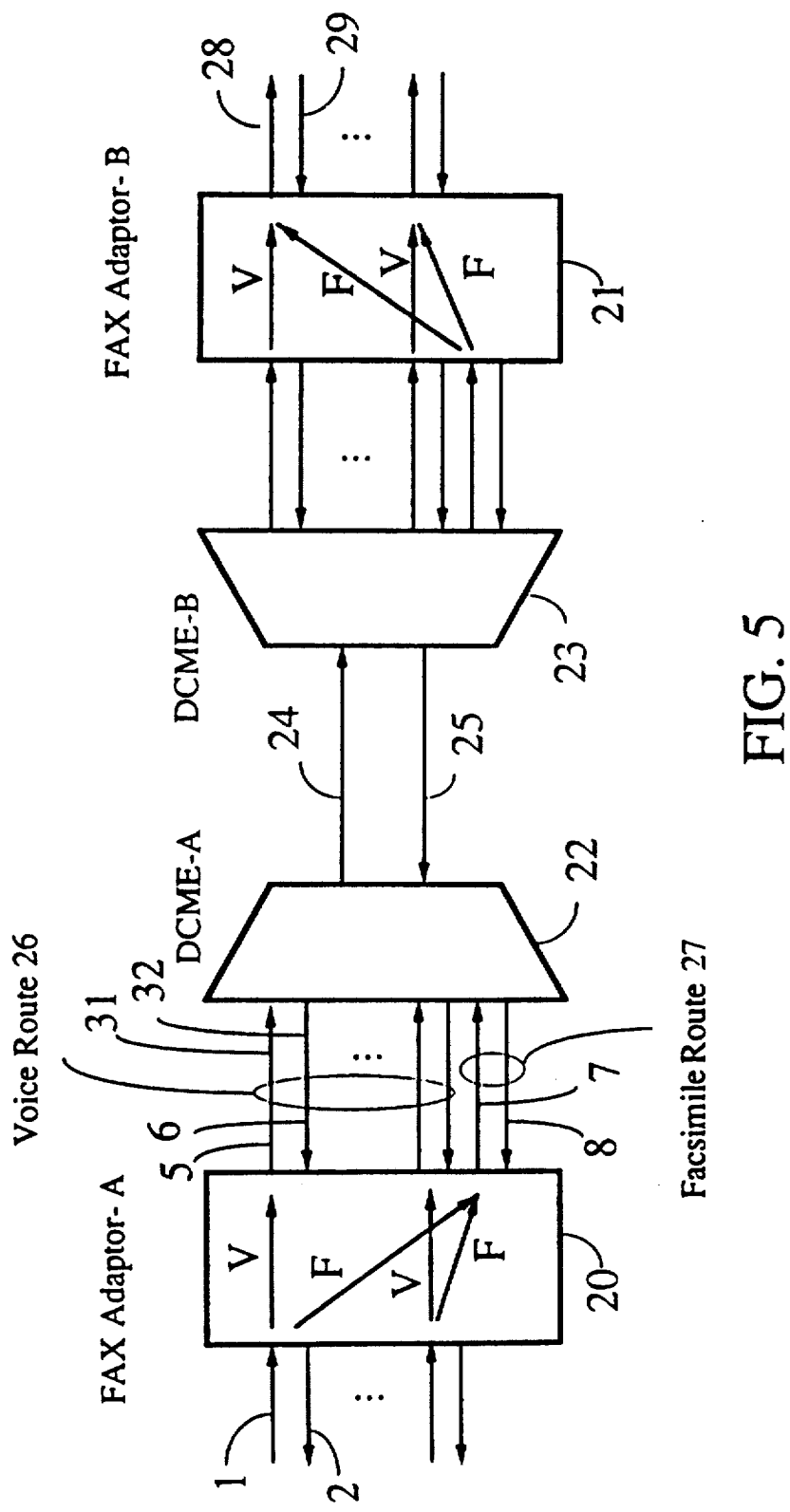
FIG. 5 is an operational schematic of the FAX adaptor system of the present invention.

FIG. 5 is a operational block diagram which explains the FAX adapter system. In FIG. 5, 1, 2, 5, 6, 7 and 8 are trunk input or output ports of the FAX adaptor 20 respectively, which corresponds to FIG. 1, 20 and 21 are FAX adapters respectively. 24 and 25 is a bearer connection respectively, 26 is a voice route, 27 is a facsimile route. 28 is a trunk output port of the FAX adapter 21, 29 is a trunk input of the FAX adapter, 31 is a trunk input port of the DCME 22 and 31 is a trunk output port of the DCME 22. The FAX adapter is arranged at the trunk side of the DCME 22. The bearer side voice route input 6 and output 5 and the facsimile input 8 and output 7 are connected to the input, output port of the DCME. The trunk side input and output are connected to the trunk side conventional apparatus.

In FIG. 1, when the signal is inputted to the trunk input port 1, two stage exchanges are carried out by the FAX discriminator 11 and FAX modem 3 sends the input signal both to the bearer side voice route output 5 and the FAX modem 3. The FAX modem 3 discriminates whether the signal is the facsimile signal or not, and sends the result to the multiplexer 4. When the input signal is a facsimile signal, the multiplexer 4 controls the transmitting route switch 9 which stops the signal from going to the bearer side voice route output 5, and multiplexes the signal received from the FAX modem 3, and sends it to the facsimile route output 7. The multiplexer 4 requests 64 kbit/s clear channel by using TS 16 in the same way as carried out by the switching system at the trunk side in FIG. 3 under the CCITT recommendation Q. 50. The request is carried out according to the facsimile channel number.

Figure 6:
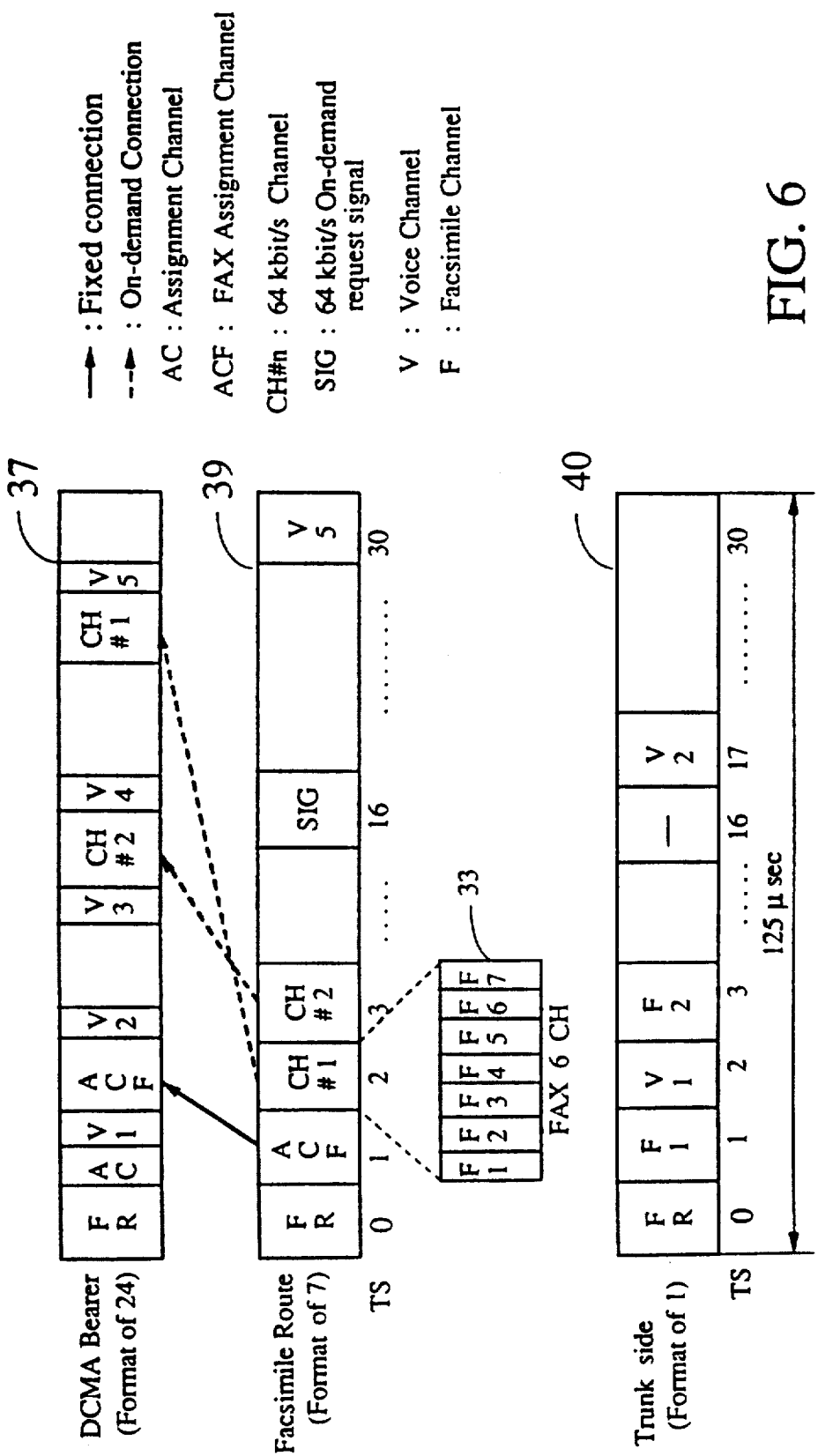
FIG. 6 shows a DCME/FAX adaptor format of the present invention.

FIG. 6 shows a DCME/FAX adaptor format of the present invention. In FIG. 6, 37 is a DCME bearer frame format, 39 is facsimile frame format, 40 is a trunk frame format and 33 is a channel construction of the facsimile route clear channel. In facsimile route 39, 6 facsimile channels are multiplexed to the channel construction 33. The 64 kbit/s channel construction 33 includes 6 channels of 9.6 kbit/s multiplexed demodulated signal. If the demodulated signal rate is lower, more than 6 channels are multiplexed.

The multiplexer 4 generates the FAX assignment channel and transmits to the facsimile route so as to exchange the information with FAX adaptor as shown in 39 of FIG. 6.

The FAX assignment channel transmits information of the detection of the condition of the transmitted demodulated facsimile signal, transmission rate, arrangement of the multiplication, capture condition and operation condition and so on. The FAX assignment channel is transmitted to the remote side FAX adaptor by the 64 kbit/s clear channel in the DCME. The multiplexer of the remote side FAX adaptor receives the FAX assignment channel and derives each demodulated facsimile signal from the multiplexed 64 kbit/s clear channel, and sends it to the FAX modem 3. The FAX modem modulates the signal and send it to the receiving route switch 10. The receiving route switch 10 sends the signal received from the route selected from the facsimile route or voice route under the control of the multiplexer 4.

When the FAX modem 3 detects the completion of the facsimile transmission, the multiplexer 4 controls the transmitting route switch 9 so that the succeeding signal is transmitted to the bearer side voice route output port 5. Then the multiplexer 4 returns to the initial condition and stops transmitting the signal. This condition continues until the next facsimile signal. During the initial condition, the voice signal is transmitted through the voice route. On the receiving side, when the facsimile signal is completed, since the FAX assignment channel is received from the remote side, the multiplexer 4 controls the receiving route switch 10 so that the signal from the bearer side voice route input 6 is switched to the trunk side output 2.

The operation of the present invention is explained hereinafter for the case where the FAX adaptor is applied to the network having the DCME. FIG. 5 illustrates the FAX adaptor of the present invention. In FIG. 5, the trunk side output, the bearer side input and the facsimile input/output of the FAX adaptor 20 are interfaces of CEPT 2 Mbps on the basis of the CCITT recommendation G series. FIG. 6 shows a frame format of the transmitting line of FIG. 5.

Until the facsimile signal is detected, the input signal which is inputted to the FAX adaptor 20 passes through the voice route 26 and is inputted to the DCME-A 22. If the input signal is a voice signal, the input signal at the DCME-A 22 is connected to the bearer only when the input signal has an active signal by the DSI function.

When the input signal at the DCME-A is changed to the facsimile signal, FAX adaptor 20 detects the facsimile signal and changes the input signal to the facsimile route. Therefore the voice route signal becomes inactive. For example, if TS 1 of the trunk side format 40 is the facsimile signal as shown in FIG. 6, the input signal is detected as a facsimile signal, and the signal is multiplexed into a TS 2 clear channel in the format 39 of the facsimile route and output as F1 in the clear channel 33. If there are other facsimile demodulated signals at the same time, the other facsimile signals F2-F6 are multiplexed into TS 2 at the same time. In the TS 2, 64 kbit/s on-demand clear channel is set beforehand under the procedure of CCITT recommendation Q. 50. The 64 kbit/s on-demand clear channel is set up bi-directionally by requesting the demand from the FAX adaptor 20 to the remote side DCME-B 23 through DCME-A 22 using the TS 16 in the facsimile route. That is, the CH#1 of TS 2 in the facsimile format route 39 searches the idle channel in the bearer format 37 and sets up the idle channel there as CH#1. The remote side DCME-B 23 regenerates the CH#1 bearer signal to the same format between the FAX adaptor-A 20 and DCME-A 22 and sends it to the FAX adaptor-B 21. The FAX adaptor-B 21 receives the signal of the format 39 and derives the facsimile signal F1 from the CH#1 and sends it to the TS 1 of the trunk side format 40.

The 64 kbit/s clear channel is set up when the facsimile signal is detected and the facsimile route is needed. The new 64 kbit/s clear channel is set up when the number of facsimiles increases and the facsimile route capacity is short. If the number of facsimiles decreases by the completion of the facsimile transmission, the 64 kbit/s clear channel is cut off and decreases capacity. The bearer channel which is not used as the 64 kbit/s clear channel is of course used for the voice channel by the DSI function. Therefore the bearer channel is controlled so that the line is used effectively by changing the ratio of the facsimile signal and the voice signal under the control of DCME. Accordingly the transmission efficiency in the case of the combination of the DCME and FAX adaptor increases in comparison to the case of using the only DCME.

Embodiment 2

Figure 2:
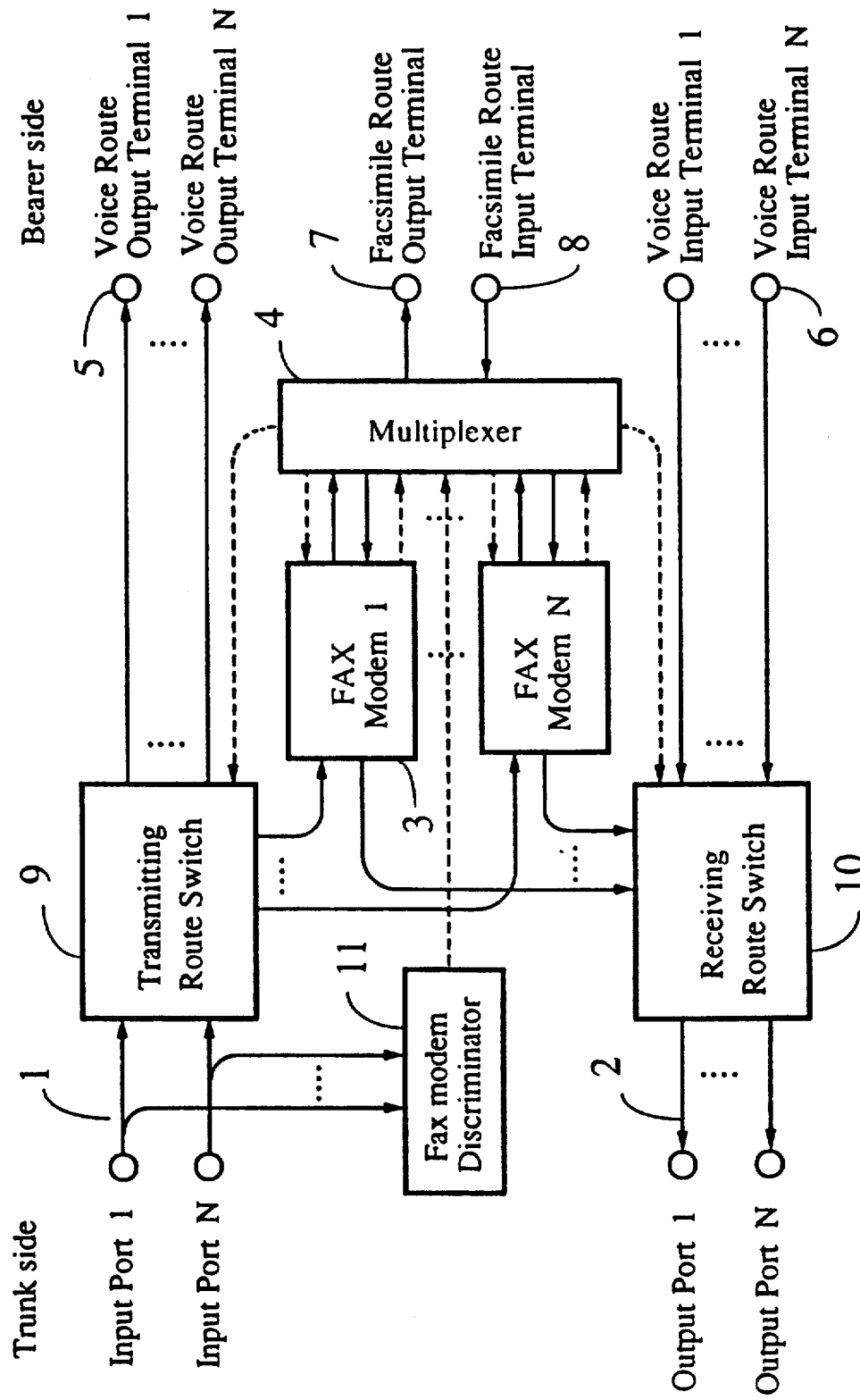
FIG. 2 shows a FAX system incorporating a second embodiment of the present invention.

FIG. 2 shows a construction of the FAX adaptor. In FIG. 2, the reference number 1-10 are the same as shown in FIG. 1. In FIG. 1, the FAX modems are provided in the same numbers as the trunk lines. Each trunk channel is connected to the corresponding FAX modems respectively. But, in FIG. 2 The FAX discriminator 11 discriminates whether the input signal is a facsimile signal or a voice signal for all trunk lines and sends the result to the multiplexer 4. When the multiplexer 4 receives the facsimile signal from the FAX discriminator 11, the multiplexer 4 controls the transmitting route switch 9 and searches the FAX modem 3 which is not used now, and sends the signal to both the FAX modem 3 and the bearer side voice route output port 5. The FAX modem 3 discriminates whether the input signal is the facsimile signal or not, and sends to the multiplexer 4. Succeeding procedures are the same as those shown in FIG. 1. In the above embodiment, two stage selections are carried out by the FAX discriminator 11 and FAX modem 3, but it is possible to select by using the information only from the FAX discriminator. If the FAX discriminator is a simple type such as a 2100 Hz detector and has a possibility to detect the non-facsimile signal as a facsimile signal, two stage selections by the FAX discriminator 11 and FAX modem 3 are effective. When the facsimile signal is completed, in the embodiment of FIG. 1, the transmitting route switch 9 returns to the initial condition in which the input signal is transmitted both to the bearer side voice route output port 5 and FAX modem 3.

But in FIG. 2, input signal is transmitted to the bearer side voice route output port 5. And the FAX modem 3 is released and set up into the initial condition which is used for newly detected other channels. As described above, the capacity of the FAX modem 3 is not required to be the same capacity as the trunk channel and is sufficient in the capacity as decided by the capacity of the bearer transmission line or the facsimile occupation factor of the trunk transmission line. Accordingly the capacity of the FAX modem 3 decreases compared with the case of FIG. 1.

In FIG. 1, all facsimile signals pass through the facsimile route. But the FAX modem 3 judges whether the signal can be processed in the FAX modem, and sends the results to the multiplexer 4 and the multiplexer 4 transmits only the facsimile signal which can be transmitted through the facsimile route. This procedure is possible because the facsimile can be transmitted by the voice route which is less efficient than the facsimile route in the FAX adaptor. The facsimile apparatus sometimes operates under the standard procedure of CCITT recommendation T. 30 and other times operates under the non-standard procedure which is a proprietary protocol specified individually by facsimile manufacturers. When the FAX adaptor transmits the signal of the standard procedure through the facsimile route and transmits the signal of the non-standard procedure through the voice route, the apparatus of this method operates very effectively.

Embodiment 3

Figure 7:
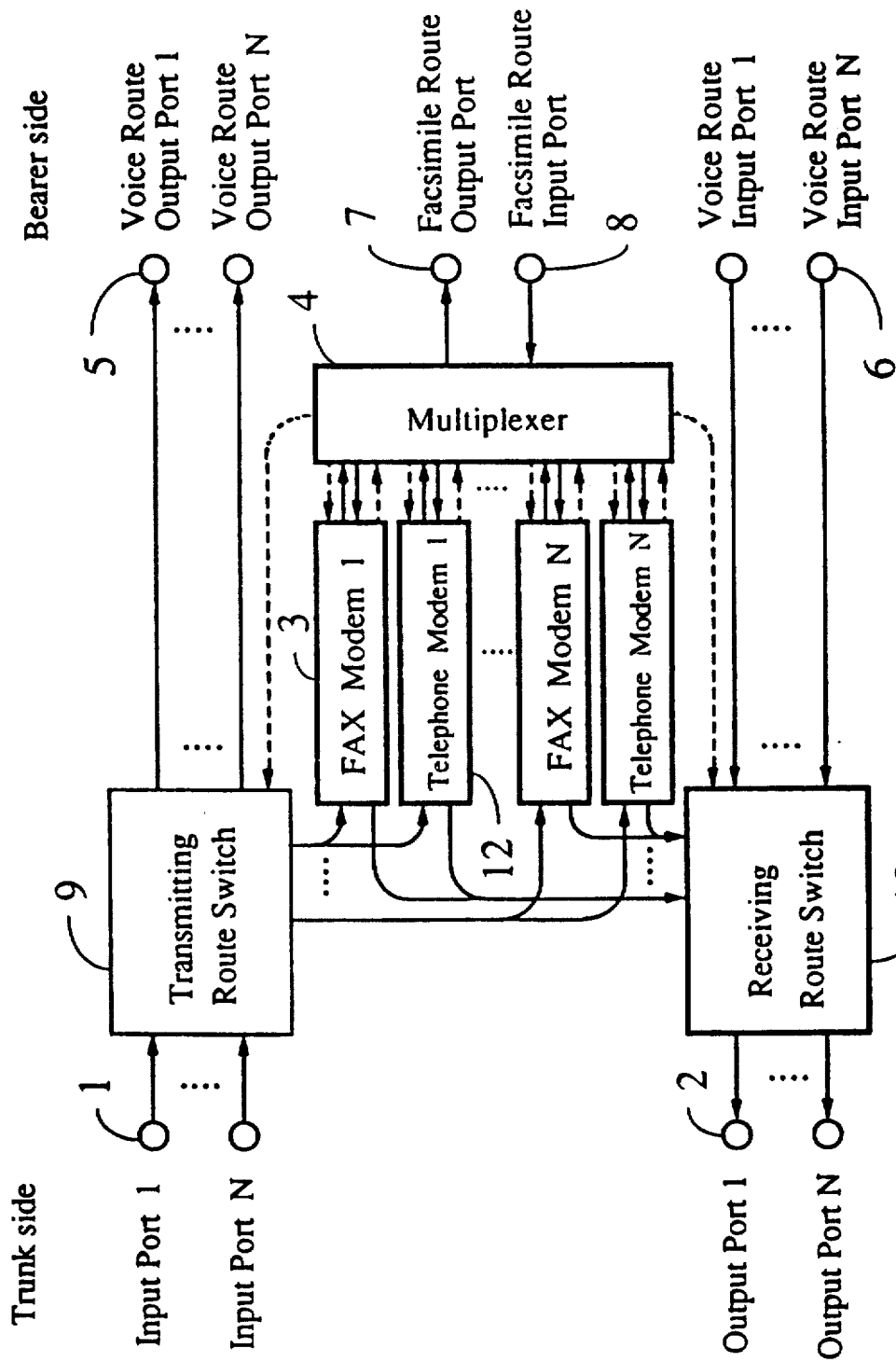
FIG. 7 shows a FAX system incorporating a third embodiment of the present invention.

FIG. 7 shows a third embodiment of the present invention. In FIG. 7, the reference numerals 1-10 are the same as those in FIG. 1. 12 is a telephone modem. The telephone modem 12 receives the signal in parallel with the FAX modem 3 from the transmitting route switch 9 and detects and demodulates the received signal. The telephone modem 12 sends the demodulated signal to the multiplexer 4. The facsimile signal is demodulated by the FAX modem 3 and transmitted to the multiplexer 4. The multiplexer 4 receives the detected signal from the FAX modem 3 or the telephone modem 12 and transmits these signal selectively to the remote side FAX adaptor using the FAX assignment channel. At the receiving side, the received signal is modulated by the FAX modem 3 or the telephone modem 12 and transmitted to the trunk side.

Embodiment 4

Figure 8:
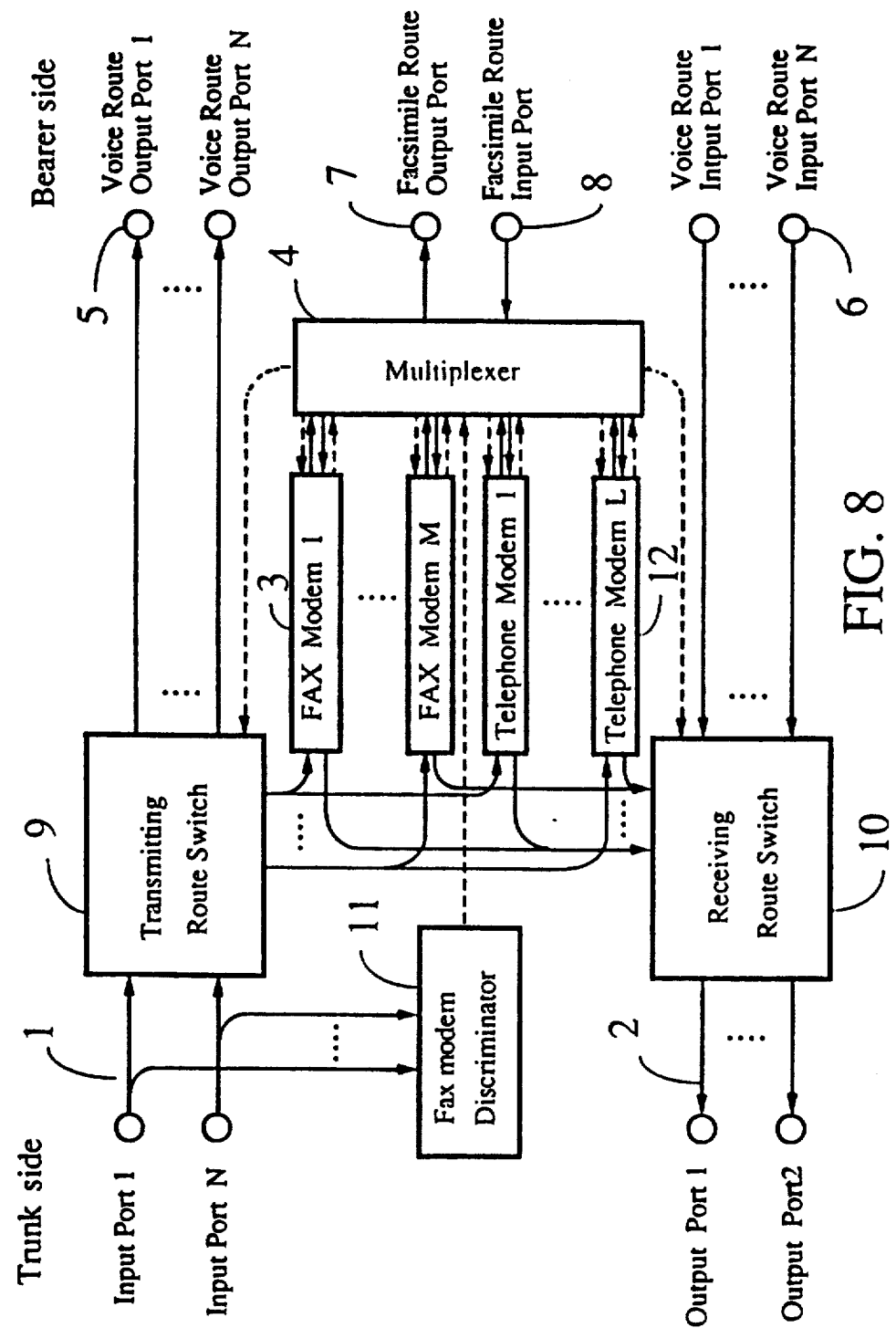
FIG. 8 shows a FAX system incorporating a fourth embodiment of the present invention.

FIG. 8 shows a fourth embodiment of the present invention. In FIG. 8 reference numeral 11 indicates facsimile/modem discriminators. In this FAX adaptor, the telephone modem 12 is added to the FAX adaptor of the FIG. 2 and the telephone modem signal is modulated/demodulated and transferred. In this FAX adaptor, the capacity of the telephone modem 12 can be smaller than the trunk channel as in the case of the FAX modem 3, but need not to be the same capacity as the FAX modem 3. The facsimile/modem discriminator 11 includes a telephone modem signal discrimination function in addition to the FAX discriminator 11 of FIG. 2.

The facsimile/modem discriminator 11 operates in the same way as the FAX discriminator 11 in FIG. 2, and sends the detection results to the multiplexer 4.

In FIG. 7, and FIG. 8, though the FAX modem and telephone modem are separated, they may be combined into one apparatus without changing the circuit operation.

What is claimed is:

1. A high efficiency facsimile transmission apparatus for a digital public telephone circuit which includes a facsimile and voice signal capability comprising:
    a transmitting route switch for switching an input signal received at the trunk side input port for transmission as facsimile signals and voice signals, said input signals being continuously connected to be sent to facsimile modems, and said voice signals being connected to be transmitted directly to a bearer side voice route output port;
    a plurality of facsimile modems equal in number to the number of trunk side input channels for demodulating and discriminating said facsimile signals received from said transmitting route switch and modulating the signals received from a bearer side;
    a multiplexer connected to said facsimile modems for multiplexing a plurality of demodulated facsimile signals and transmitting them directly to the bearer side facsimile route output port, for controlling said transmitting route switch responsive to the discrimination by said facsimile modems and for preventing transmission of said voice signal when switched to the facsimile route line, for setting up a clear channel on a bearer side facsimile route on the basis of 64 kbit/s on-demand clear channel setting function of CCITT Recommendation Q.50 signalling system, for transmitting a control signal to the facsimile route output port, and for receiving a control signal from the remote side multiplexer and for deriving the multiplexed facsimile signal and sending it to the modem which is assigned by the multiplexer to respond; and
    a receiving route switch for switching the signals received from said facsimile modems and the input voice signal received from the bearer route, and for sending said switched signal to the trunk side output port.

2. The high efficiency facsimile transmission apparatus of claim 1 further comprising: a facsimile signal discriminator connected to said trunk side input port for discriminating only the facsimile signal and transmitting the discrimination result to said multiplexer, whereby said multiplexer connects only the facsimile signal to said facsimile modems by controlling said transmitting route switch to reduce the number of facsimile modems required relative to the number of trunk side input channels.

3. The high efficiency facsimile transmission apparatus of claim 1 further comprising: a telephone modem signal discriminator connected to said trunk side input port for discriminating only the telephone modem signal and transmitting it to the telephone modem.

* * * * *

UNITED STATES PATENT AND TRADEMARK OFFICE
CERTIFICATE OF CORRECTION

PATENT NO. : 5,307,174
DATED : April 26, 1994
INVENTOR(S) : Kazuo Saito

It is certified that error appears in the above-identified patent and that said Letters Patent is hereby corrected as shown below:

Col. 1, line 55, "operated" should be --operate--.

Signed and Sealed this

Twenty-fifth Day of October, 1994

Attest:

BRUCE LEHMAN

Attesting Officer     Commissioner of Patents and Trademarks